(12) United States Patent
Yoshida et al.

(10) Patent No.: US 11,450,923 B2
(45) Date of Patent: *Sep. 20, 2022

(54) METHOD FOR INTERRUPTING SHORT CIRCUIT CURRENT IN BATTERY SYSTEM, BATTERY SYSTEM, AND ELECTRIC VEHICLE AND POWER STORAGE DEVICE WHICH ARE EQUIPPED WITH BATTERY SYSTEM

(71) Applicant: SANYO Electric Co., Ltd., Daito (JP)

(72) Inventors: Naotake Yoshida, Hyogo (JP); Kazuhiro Harazuka, Hyogo (JP); Nobuo Iwatsuki, Hyogo (JP); Shinji Ota, Hyogo (JP)

(73) Assignee: SANYO Electric Co., Ltd., Daito (JP)

( * ) Notice: Subject to any disclaimer, the term of this patent is extended or adjusted under 35 U.S.C. 154(b) by 7 days.

This patent is subject to a terminal disclaimer.

(21) Appl. No.: 16/962,090

(22) PCT Filed: Nov. 15, 2018

(86) PCT No.: PCT/JP2018/042201
§ 371 (c)(1),
(2) Date: Jul. 14, 2020

(87) PCT Pub. No.: WO2019/150706
PCT Pub. Date: Aug. 8, 2019

(65) Prior Publication Data
US 2020/0343508 A1    Oct. 29, 2020

(30) Foreign Application Priority Data
Jan. 30, 2018   (JP) .............................. JP2018-013621

(51) Int. Cl.
*H01M 50/502*   (2021.01)
*H01M 50/572*   (2021.01)
(Continued)

(52) U.S. Cl.
CPC ......... *H01M 50/446* (2021.01); *H01M 50/20* (2021.01); *H01M 50/502* (2021.01); *H01M 50/572* (2021.01); *H01M 2220/20* (2013.01)

(58) Field of Classification Search
CPC ............. H01M 50/578; H01M 50/103; H01M 50/502; H01M 50/581; H01M 50/15; H01M 50/242; H01M 50/572; H01M 2220/20
See application file for complete search history.

(56) References Cited

U.S. PATENT DOCUMENTS

2006/0267545 A1   11/2006   Lee et al.
2006/0292437 A1*  12/2006   Matsumoto ........... H01M 50/10
                                                                429/82
(Continued)

FOREIGN PATENT DOCUMENTS

JP      2006-19140 A      1/2006
JP      2008-544439 A    12/2008
(Continued)

OTHER PUBLICATIONS

International Search Report dated Jan. 15, 2019, issued in counterpart application No. PCT/JP2018/042201, with English translation. (3 pages).

(Continued)

*Primary Examiner* — Allison Bourke
*Assistant Examiner* — Jason Barton
(74) *Attorney, Agent, or Firm* — WHDA, LLP

(57) ABSTRACT

A short circuit current interruption method of a battery system including: stacking a plurality of prismatic battery cells and connecting the plurality of prismatic battery cells with a parallel connection bus bar in parallel to form a battery block, wherein a sealing plate of the prismatic battery cell is a plate material having flexibility that deforms when an internal pressure rises due to an internal short circuit, and when a rise in the internal pressure due to the internal short circuit of the prismatic battery cell causes deformation, the deformation of the sealing plate is detected, and when an amount of deformation exceeds a setting value, (Continued)

the short circuit current of the battery connected in parallel with the internally short circuited battery is interrupted.

7 Claims, 15 Drawing Sheets

(51) Int. Cl.
*H01M 50/446* (2021.01)
*H01M 50/20* (2021.01)

(56) References Cited

U.S. PATENT DOCUMENTS

| | | |
|---|---|---|
| 2010/0167116 A1 | 7/2010 | Okada |
| 2013/0273404 A1 | 10/2013 | Ochi et al. |
| 2015/0207131 A1 | 7/2015 | Han |
| 2016/0359160 A1* | 12/2016 | Byun ................. H01M 50/502 |
| 2017/0047576 A1* | 2/2017 | Guen ................. H01M 50/394 |
| 2017/0062795 A1* | 3/2017 | Byun ................ H01M 10/0525 |
| 2017/0237060 A1 | 8/2017 | Inoue et al. |

FOREIGN PATENT DOCUMENTS

| | | |
|---|---|---|
| JP | 2010-157451 A | 7/2010 |
| JP | 2013-206734 A | 10/2013 |
| JP | 2014-32873 A | 2/2014 |

OTHER PUBLICATIONS

Extended European Search Report dated Feb. 11, 2021, issued in counterpart EP application No. 18903198.2. (25 pages).

\* cited by examiner

METHOD FOR INTERRUPTING SHORT CIRCUIT CURRENT IN BATTERY SYSTEM, BATTERY SYSTEM, AND ELECTRIC VEHICLE AND POWER STORAGE DEVICE WHICH ARE EQUIPPED WITH BATTERY SYSTEM

TECHNICAL FIELD

The present invention relates to a battery system including a plurality of batteries, and more particularly to a short circuit current interruption method for a battery system, a battery system for preventing induction of thermal runaway due to an internal short circuit and ensuring high safety, an electric vehicle with the battery system, and a power storage device.

BACKGROUND ART

A battery system formed by stacking a plurality of battery cells is used for various purposes. In this battery system, the output current can be increased by connecting a plurality of adjacent battery cells in parallel, and the output power can be increased by connecting the battery cells, which are connected in parallel, in series. For this reason, this battery system is preferably used for applications that require large output power.

In such a battery system, when a high-performance secondary battery such as a lithium ion secondary battery is used, an extremely large current can flow due to an internal short circuit and the battery cell can undergo thermal runaway. When thermal runaway occurs, the battery temperature can rapidly rise and reach an extremely high temperature of 400° C. or higher. In particular, in a battery system in which a plurality of battery cells is stacked, heat energy generated when thermal runaway is induced in adjacent battery cells rapidly increases, which becomes a cause of impairing safety. In order to prevent this adverse effect, a battery has been developed that incorporates a mechanism for that interrupts the current by increasing the internal pressure when a large current flows, that is, a current interrupt device (hereinafter referred to as "CID"). (See PTL 1)

CITATION LIST

Patent Literature

PTL 1: Unexamined Japanese Patent Publication No. 2010-157451

SUMMARY OF THE INVENTION

The CID is arranged inside the battery cell between an internal electrode and an electrode terminal. This CID is normally in an ON state and electrically connects the internal electrode and the electrode terminal, but when a large current flows due to an internal short circuit and the internal pressure rises abnormally, the CID is switched to an OFF state to interrupt the current. However, although the CID interrupts the current when the internal pressure rises in a state where a large current flows due to an internal short circuit, when the internal temperature becomes abnormally high, an internal insulating material melts and normal operation cannot be maintained, and the CID cannot interrupt the current. In particular, in a battery system in which adjacent battery cells are connected in parallel, when a battery cell connected in parallel with an internally short circuited battery cell (called a trigger cell) is externally short circuited by the trigger cell, an excessive short circuit current flows into the trigger cell, and the temperature of the battery cell adjacent to the trigger cell can rise to induce thermal runaway.

The present invention was developed for the purpose of preventing the above-mentioned adverse effect, and an important object of the present invention is to provide a technique that unfailingly prevents induction of thermal runaway of a battery cell adjacent to a battery cell that has undergone thermal runaway due to internal short circuit and ensure high safety.

A short circuit current interruption method of a battery system according to an aspect of the present invention is a short circuit current interruption method of a battery system including: a battery block formed by stacking a plurality of prismatic battery cells having positive and negative electrode terminals on a sealing plate; and a parallel connection bus bar connected to the electrode terminal of the prismatic battery cell and connecting some or all of the prismatic battery cells in parallel. In the short circuit current interruption method, the sealing plate of the prismatic battery cell is a plate material having flexibility that deforms when an internal pressure rises due to an abnormality in the prismatic battery cell, and when deformation of the sealing plate of the prismatic battery cell exceeds a setting value, a short circuit current of the prismatic battery cell connected in parallel is interrupted.

A battery system according to an aspect of the present invention includes: a battery block formed by stacking a plurality of prismatic battery cells having positive and negative electrode terminals on a sealing plate; a parallel connection bus bar connected to the electrode terminal of the prismatic battery cell and connecting some or all of the prismatic battery cells in parallel, and a current interrupter that interrupts a short circuit current of the prismatic battery cell connected in parallel via the parallel connection bus bar. The sealing plate of the prismatic battery cell has flexibility that deforms when an internal pressure rises due to internal short circuit of the prismatic battery cell, and the current interrupter detects deformation of the sealing plate due to a rise in internal pressure due to the internal short circuit of the prismatic battery cell and interrupts a short circuit current of the prismatic battery cell connected in parallel.

Further, an electric vehicle including the battery system including the configuration elements of the above aspect includes the battery system, a motor for traveling supplied with electric power from the battery system, a vehicle body equipped with the battery system and the motor, and wheels driven by the motor to cause the vehicle body to travel.

Further, a power storage apparatus including the battery system including the configuration elements of the above aspect includes the battery system and a power supply controller that controls charging and discharging of the battery system, in which the power supply controller enables charging of the prismatic battery cell with electric power from outside, and controls charging to be performed on the battery cell.

The short circuit current interruption method of a battery system and the battery system of the present invention unfailingly prevent induction of thermal runaway to a parallel battery connected in parallel with a prismatic battery cell that has undergone thermal runaway due to internal short circuit, and ensures high safety. This is because the deformation of a sealing plate of the prismatic battery cell the internal pressure of which has risen due to internal short

DESCRIPTION OF EMBODIMENT

Figure 1:
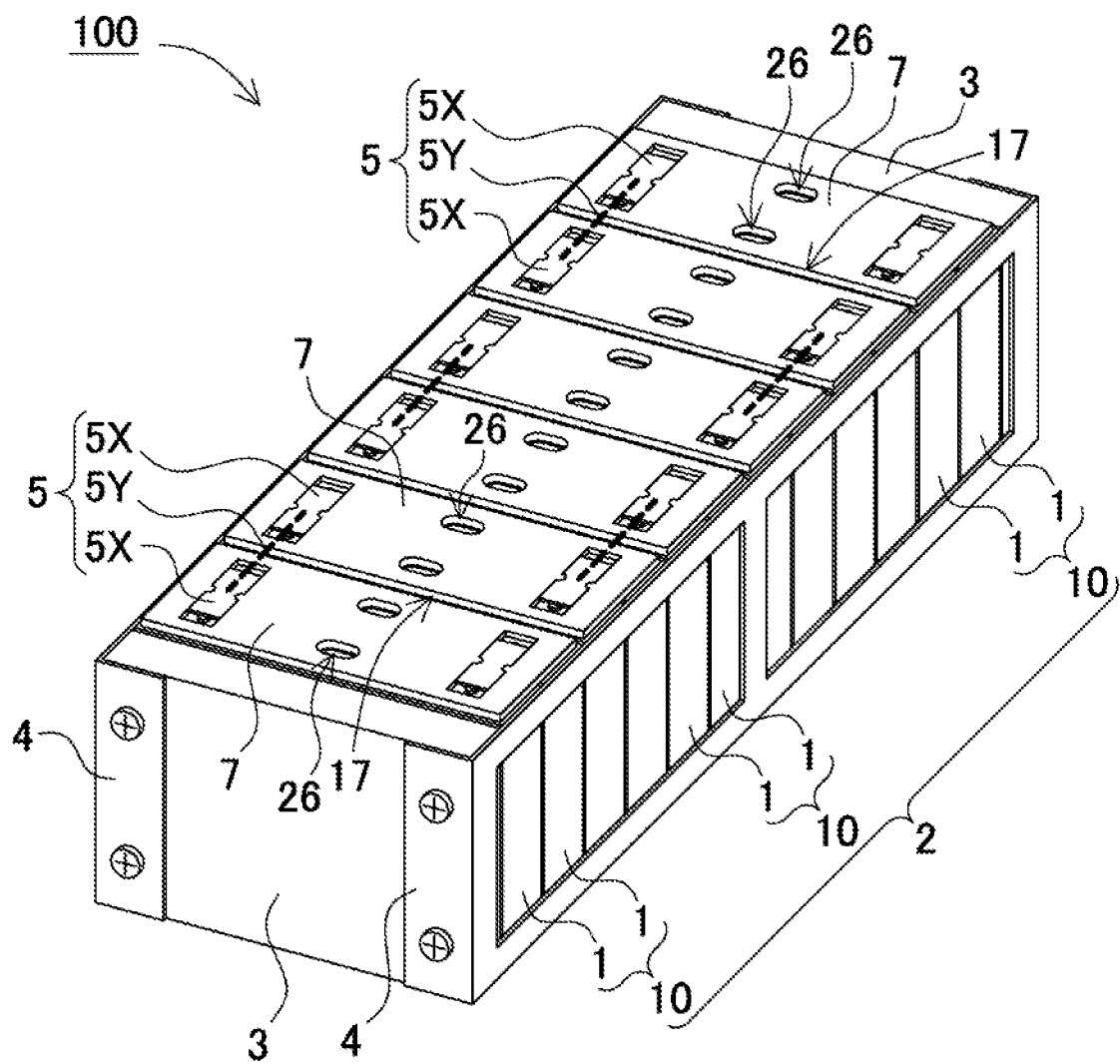
FIG. 1 is a perspective view of a battery system according to an exemplary embodiment of the present invention.

First, one point of interest of the present invention will be described. In a battery system in which a plurality of battery cells is stacked, adjacent battery cells are connected in parallel to increase the output current, but in this battery system, in cases where any of the battery cells is internally short circuited, when a battery cell connected in parallel with the internally short circuited battery cell is externally short circuited by the short circuited battery cell, an excessive short circuit current can flow to cause thermal runaway. Since the internal resistance of the internally short circuited battery cell and the internal resistance of the battery cell connected in parallel to this battery cell are extremely small, the short circuit current of the battery cell connected in parallel to the internally short circuited battery cell also becomes an extremely large current, causing induction of thermal runaway. The induction of thermal runaway of the battery cells connected in parallel causes an extremely large heat energy to be generated, which becomes a cause of impairing safety.

The current interruption in the state where an excessive current flows can be achieved by coupling a fuse to each battery cell. However, in a battery system in which the load current fluctuates significantly, when the fuse blows at a peak value of the load current, power cannot be supplied to the load. In reality, it is extremely difficult to set the fusing current of the fuse such that the fuse is unfailingly blown at an excessive current such as internal short circuit, but is not blown at the peak value of the load current. When the fusing current is set such that the fuse is unfailingly blown by an excessive current at the time of abnormality, the fuse can be blown by the peak current of the load that flows instantaneously. On the contrary, when the fusing current is set such that the fuse is not blown by the peak current of the load, the fuse cannot be blown by an excessive current at the time of abnormality. Further, in a battery system in which a fuse is connected in series with each battery cell, power is unnecessarily consumed due to the electrical resistance of the fuse, so that power loss due to the fuse cannot be ignored and there is also an adverse effect that the efficiency of use of power decreases.

As described above, in the battery system having a configuration in which a plurality of battery cells is connected in parallel, it is important that when any of the battery cells undergoes thermal runaway, the connection of the battery cell connected in parallel with this battery cell is immediately interrupted to unfailingly prevent induction of thermal runaway of a plurality of batteries. In particular, it is important to study a method and a configuration that can unfailingly prevent short circuit current and ensure high safety without using a current interruption element such as a fuse or a CID.

The short circuit current interruption method according to an aspect of the present invention may be specified by the following method. The short circuit current interruption method of a battery system is a method for interrupting a short circuit current of a battery system including battery block 2 formed by stacking a plurality of prismatic battery cells 1 each having positive and negative electrode terminals 13 on sealing plate 12 and parallel connection bus bar 5X connected to electrode terminal 13 of prismatic battery cell 1 and connecting some or all of prismatic battery cells 1 in parallel, wherein sealing plate 12 of prismatic battery cell 1 is a plate material having flexibility that deforms when an internal pressure rises due to an abnormality in prismatic battery cell 1, and when the deformation of sealing plate 12 of prismatic battery cell 1 exceeds a setting value, the short circuit current of prismatic battery cell 1 connected in parallel is interrupted.

According to the above method, a flexible plate that deforms due to an internal pressure increase due to an internal short circuit is used as the sealing plate of the prismatic battery cell, and when the internal pressure rises due to an internal short circuit, the sealing plate is deformed and its deformation is detected, and when the sealing plate is deformed, the short circuit current of the parallel battery is interrupted. That is, since the deformation of the sealing plate is detected and the short circuit current of the parallel battery is interrupted, it is not necessary to connect an element that interrupts the current in series with the battery like a fuse, and it is possible to unfailingly interrupt the short circuit current of the parallel battery without consuming wasteful power like the fuse. Further, since the internal short circuited battery rises in internal pressure due to an excessive current, the feature that the short circuit current of the parallel battery can be unfailingly interrupted is also achieved by interrupting the short circuit current by the deformation of the sealing plate which is deformed by the internal pressure increase.

The short circuit current interruption method may be configured such that insulating plate 7 is disposed on the surface of sealing plate 12 of prismatic battery cell 1, a part of insulating plate 7 is disposed between parallel connection bus bar 5X and sealing plate 12, when the internal pressure rises due to the short circuit current of prismatic battery cell 1 and sealing plate 12 is deformed to push up insulating plate 7, insulating plate 7 pushed up cuts parallel connection bus bar 5X or separates a connection between parallel connection bus bar 5X and electrode terminal 13 to interrupt the short circuit current of prismatic battery cell 1 connected in parallel.

The battery system according to an aspect of the present invention may be specified by the following configuration. The battery system includes battery block 2 formed by stacking a plurality of prismatic battery cells 1 each having positive and negative electrode terminals 13 on sealing plate 12, parallel connection bus bar 5X connected to electrode terminal 13 of prismatic battery cell 1 and connecting some or all of prismatic battery cells 1 in parallel, and current interrupter 6 that interrupts short circuit current of prismatic battery cell 1 connected in parallel via parallel connection bus bar 5X, wherein sealing plate 12 of prismatic battery cell 1 is configured to have flexibility that deforms when the internal pressure rises due to internal short circuit of prismatic battery cell 1, and current interrupter 6 detects the deformation of sealing plate 12 due to an increase in internal pressure due to the internal short circuit of prismatic battery cell 1 and interrupts the short circuit current of prismatic battery cell 1 connected in parallel.

According to the above configuration, a flexible plate that deforms due to an internal pressure increase due to an internal short circuit is used as the sealing plate of the prismatic battery cell, and when the internal pressure rises due to an internal short circuit, the sealing plate is deformed and its deformation is detected by the current interrupter, and the short circuit current of the parallel battery is interrupted. That is, since the deformation of the sealing plate is detected by the current interrupter and the short circuit current of the parallel battery is interrupted, it is not necessary to connect an element that interrupts the current in series with the battery like a fuse, and it is possible to unfailingly interrupt the short circuit current of the parallel battery without consuming wasteful power like the fuse. Further, since the internal short circuited battery cell rises in internal pressure due to an excessive current, the feature that the short circuit current of the parallel battery can be unfailingly interrupted is also achieved by interrupting the short circuit current by the deformation of the sealing plate which is deformed by the internal pressure increase.

Further, the battery system may be configured such that current interrupter 6 includes interrupting portion 6B that interrupts the short circuit current of prismatic battery cell 1 connected in parallel when the deformation of sealing plate 12 exceeds a setting value.

Further, in the battery system, deformation detector 6A and interrupting portion 6B may be insulating plate 7 that is arranged on the surface of sealing plate 12 of prismatic battery cell 1 is partially arranged between parallel connection bus bar 5X and sealing plate 12. Insulating plate 7 may be configured to include pressing portions 22 on both sides arranged between a pair of parallel connection bus bars 5X and sealing plate 12, and plate portion 21 arranged on the surface of sealing plate 12 of prismatic battery cell 1 connected in parallel and coupling pressing portions 22, in which a pressing force that presses parallel connection bus bar 5X by pressing portions 22 of insulating plate 7 due to the deformation of sealing plate 12 cuts off parallel connection bus bar 5X or parallel connection bus bar 5X is separated from electrode terminal 13 and the short circuit current of prismatic battery cells 1 connected in parallel is interrupted.

Parallel connection bus bar 5X may be configured to include a cut portion that is cut by the pressing force of pressing portions 22 of insulating plate 7. In addition, parallel connection bus bar 5X may have a coupling strength to be separated from electrode terminals 13 by being pressed by pressing portions 22 of insulating plate 7.

Hereinafter, an exemplary embodiment of the present invention will be described with reference to the drawings. However, the exemplary embodiment described below exemplifies a method and a configuration for embodying the technical idea of the present invention, and the present invention is not limited to the following methods and things. Further, members indicated in the claims are not limited to the members of the exemplary embodiment. In particular, the dimensions, materials, shapes, relative arrangements, and the like of the constituent members described in the exemplary embodiment are not intended to limit the scope of the present invention thereto, unless otherwise specified, and are mere explanatory examples. The sizes and positional relationships of members shown in the drawings may be exaggerated for clarity of description. Further, in the following description, the same names and reference numerals indicate the same or similar members, and detailed description will be appropriately omitted. Further, each element constituting the present invention may be configured such that a plurality of elements is configured by the same member and one member also serves as a plurality of elements, or conversely, the function of one member can be shared and achieved by a plurality of members. Also, the content described in some of examples and exemplary embodiments may be applicable to other examples and exemplary embodiments.

Hereinafter, an embodiment of the battery system will be described based on an example optimum for a vehicle battery system. Battery system 100 shown in the overall perspective view of FIG. 1 includes battery block 2 formed by stacking a plurality of prismatic battery cells 1 and bus bar 5 connected to electrode terminal 13 of each prismatic battery cell 1 constituting battery block 2 and connecting prismatic battery cells 1 in parallel and in series. In battery system 100 of FIG. 1, prismatic battery cells 1 are connected in parallel and in series. Bus bar 5 includes parallel connection bus bar 5X connecting prismatic battery cells 1 in parallel and serial connection bus bar 5Y connecting prismatic battery cells 1 in series. In battery system 100, prismatic battery cells 1 can be connected in parallel to increase the output current, and connected in series to increase the output voltage. Therefore, in battery system 100, prismatic battery cells 1 are connected in parallel and in series such that the output current and output voltage are optimal for the application.

Battery block 2 includes a plurality of prismatic battery cells 1 stacked via an insulating separator (not shown). Further, in battery block 2, a pair of end plates 3 are disposed on the end surfaces on both sides of stacked prismatic battery cells 1, and end plates 3 are coupled by bind bar 4 to fix the plurality of prismatic battery cells 1 in a pressed state.

Prismatic battery cell 1 is a non-aqueous electrolyte secondary battery such as a lithium ion secondary battery. Battery system 100 in which prismatic battery cell 1 is a lithium ion secondary battery can have a large charge and discharge capacity with respect to volume and weight, but as prismatic battery cell 1, all other secondary batteries with small internal resistance, large capacity, and large output can be used instead of the lithium ion secondary battery.

Figure 2:
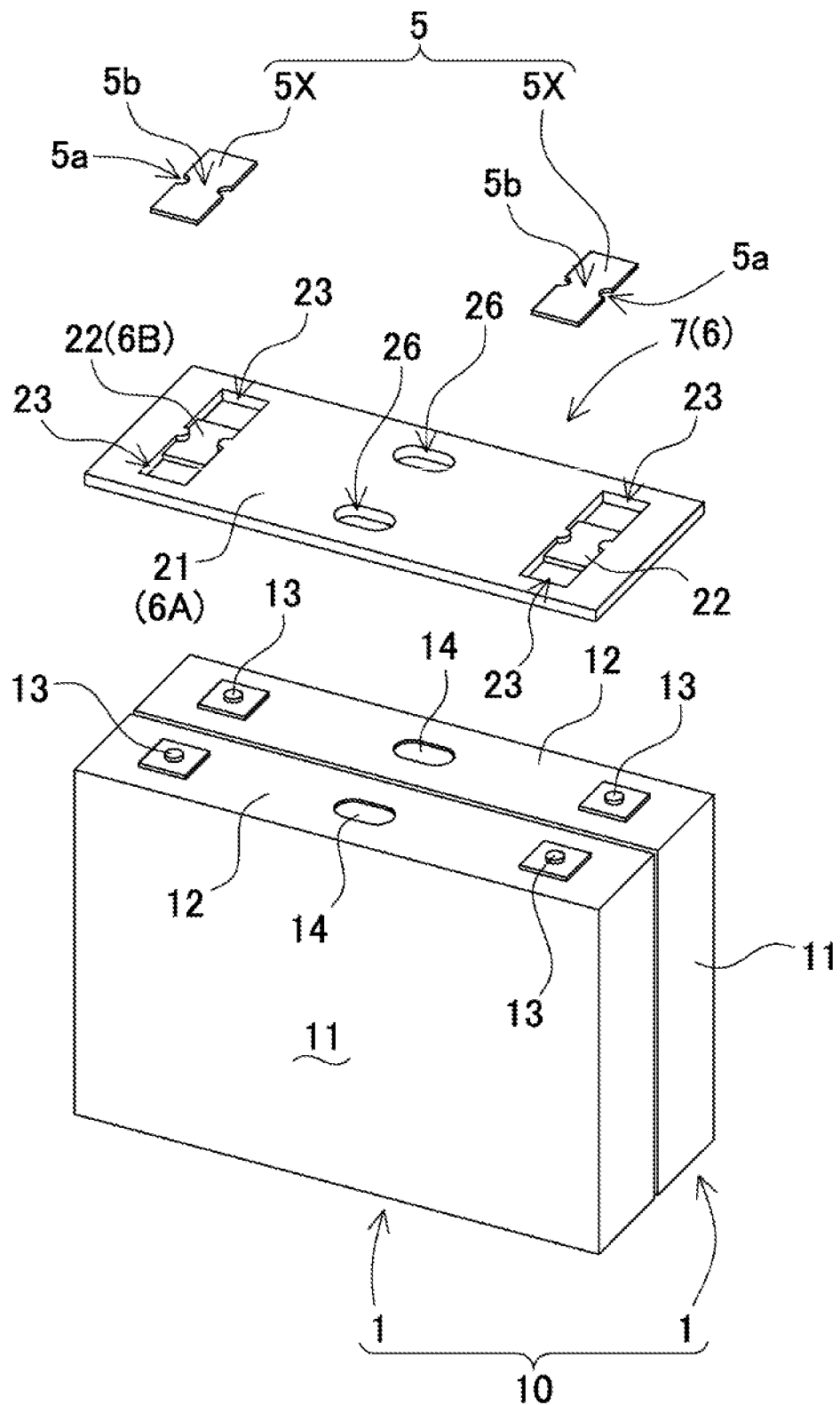
FIG. 2 is an exploded perspective view of a parallel battery unit of the battery system shown in FIG. 1.

As shown in an exploded perspective view of FIG. 2, prismatic (=rectangular) battery cell 1 has sealing plate 12 hermetically closing an opening of metal exterior can 11 whose thickness is smaller than the width of the upper side. Exterior can 11 is formed into a thick rectangular shape by additionally drawing a metal sheet. Exterior can 11 and sealing plate 12 are made of a metal sheet such as aluminum or an aluminum alloy. Sealing plate 12 hermetically seals the upper opening of exterior can 11 via an insulating material (not shown). Further, sealing plate 12 has positive and negative electrode terminals 13 fixed to both ends via an insulating material (not shown). Furthermore, sealing plate 12 is provided with exhaust valve 14 between electrode terminals 13. Exhaust valve 14 opens when the internal pressure of exterior can 11 rises to or above a predetermined value, releases the gas inside, and prevents exterior can 11 from bursting.

Sealing plate 12 is a flexible plate material that deforms in a state where the internal pressure rises due to an abnormality of prismatic battery cell 1 such as internal short circuit. For sealing plate 12, a flexible metal sheet such as aluminum (in this specification, aluminum is used to include an aluminum alloy) can be used. Metal sealing plate 12 can be adjusted for material and thickness to achieve the flexibility of being deformed when the internal pressure rises due to internal short circuit. For example, sealing plate 12 made of an aluminum alloy has a thickness of 0.5 mm to 2 mm, preferably 1 mm to 1.5 mm, and can achieve the flexibility of being deformed by an increase in internal pressure due to an internal short circuit. However, sealing plate 12 does not necessarily have to be a metal sheet, and may be, for example, a plastic plate or a rubber-like elastic plate having excellent heat resistance.

Prismatic battery cell 1 is provided with exhaust valve 14 that opens when the internal pressure rises abnormally to prevent exterior can 11 from bursting. Prismatic battery cell 1 of FIG. 2 is provided with exhaust valve 14 at a central portion of sealing plate 12. Exhaust valve 14 opens at a set pressure to discharge the gas inside. Exhaust valve 14 has a set pressure for valve opening at which the valve is opened after current interrupter 6 described later detects the deformation of sealing plate 12 and interrupts the short circuit current of the parallel battery. In addition, in this specification, a parallel battery means a prismatic battery cell that is connected in parallel to an arbitrary prismatic battery cell.

Figure 3:
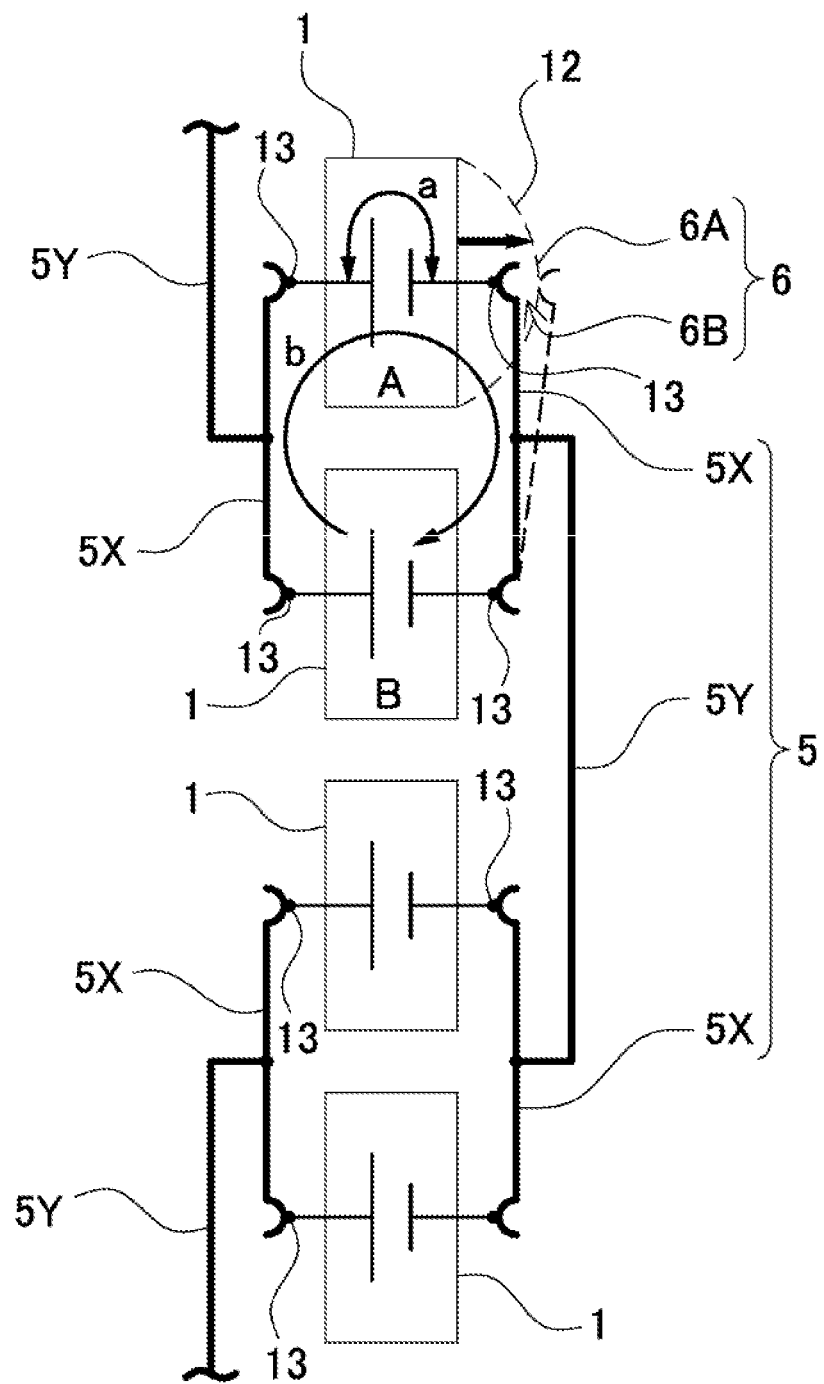
FIG. 3 is a principle diagram of a current interrupter that interrupts a short circuit current of a parallel battery in a state where any of prismatic battery cells is internally short circuited.

The battery system is provided with current interrupter 6 that interrupts the short circuit current of prismatic battery cells 1 connected in parallel, that is, the parallel battery, when any of prismatic battery cells 1 is internally short circuited. A schematic circuit diagram of FIG. 3 shows a state where, in a battery system in which a plurality of prismatic battery cells 1 is connected in parallel, when one of prismatic battery cells A (uppermost prismatic battery cell 1 in the drawing) is internally short circuited (indicated by arrow a), a short circuit current also flows in an adjacent parallel battery connected in parallel with prismatic battery cell A, that is, prismatic battery cell B (prismatic battery cell 1 disposed in the second stage from the top) (indicated by arrow b). This is because, as shown in this drawing, when prismatic battery cell A is internally short circuited, prismatic battery cell B, which is the parallel battery, is short circuited by an external short circuit provided externally. In a state where any one of prismatic battery cells 1 is internally short circuited and an excessive current flows, causing thermal runaway, and an adjacent prismatic battery cell 1 also undergoes thermal runaway due to an excessive current due to an external short circuit, the thermal runaway is induced in a plurality of prismatic battery cells 1, thereby impairing safety. In order to prevent this adverse effect, current interrupter 6 interrupts the short circuit current of the parallel battery connected in parallel with internally short-circuited prismatic battery cell 1 and prevents induction of the thermal runaway.

A principle diagram of current interrupter 6 is shown in the upper part of FIG. 3. Current interrupter 6 of the battery system in this drawing detects the deformation of sealing plate 12 that is deformed as the internal pressure rises due to the short circuit current of prismatic battery cell A using deformation detector 6A, and interrupts the short circuit current that flows into prismatic battery cell B connected in parallel by interrupting portion 6B as the deformation of sealing plate 12 exceeds a setting value. Interrupting portion 6B in this drawing separates parallel connection bus bar 5X from electrode terminal 13 of prismatic battery cell A, and interrupts the short circuit current of prismatic battery cell B, which is a parallel battery. Interrupting portion 6B in this drawing interrupts the short circuit current by separating the connection between parallel connection bus bar 5X and electrode terminal 13, but interrupting portion 6B can break or cut off parallel connection bus bar 5X when the deformation of sealing plate 12 exceeds the setting value to interrupt the short circuit current of prismatic battery cell B.

Figure 4:
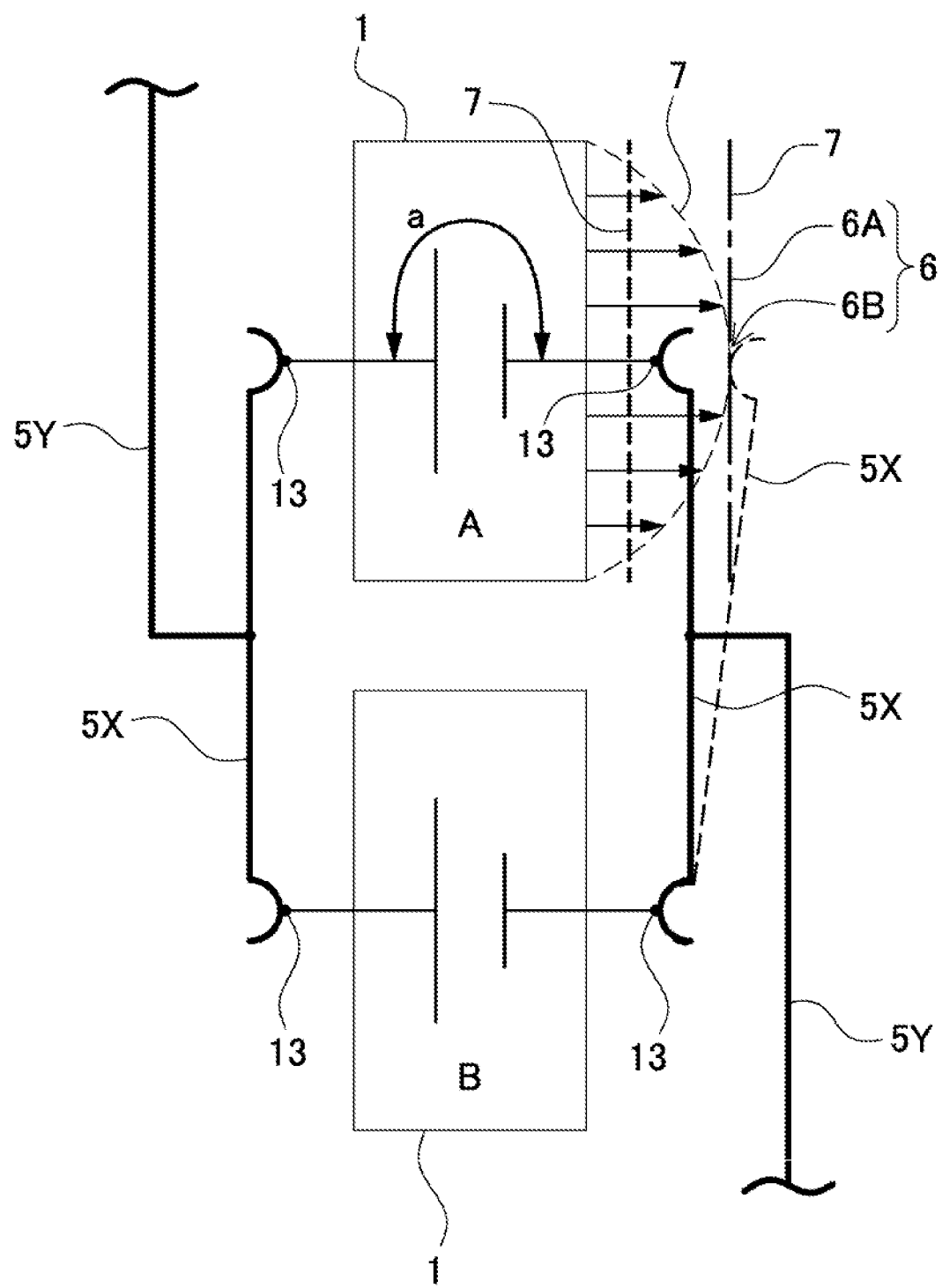
FIG. 4 is a principle diagram in which an insulating plate interrupts a short circuit current of a parallel battery.

Further, in current interrupter 6 of the battery system of FIG. 4, insulating plate 7 is disposed on the surface of sealing plate 12 of prismatic battery cell 1, both ends of insulating plate 7 are inserted between sealing plate 12 and parallel connection bus bar 5X, insulating plate 7 detects the deformation of sealing plate 12, and when the internal pressure rises due to the short circuit current of prismatic battery cell A and sealing plate 12 is deformed to push up insulating plate 7, insulating plate 7 that is pushed up pushes up parallel connection bus bar 5X, separates the connection between parallel connection bus bar 5X and electrode terminal 13, and interrupts the short circuit current of prismatic battery cell 1 connected in parallel. In current interrupter 6 in this drawing, insulating plate 7 is used as deformation detector 6A and interrupting portion 6B. Current interrupter 6 in this drawing interrupts the short circuit current by disconnecting the connection between parallel connection bus bar 5X and electrode terminal 13, but can also cut off a part of parallel connection bus bar 5X to interrupt the short circuit current.

In battery system 100 of FIG. 1, the plurality of prismatic battery cells 1 is connected in parallel by parallel connection bus bar 5X to form parallel battery unit 10, and further, parallel battery units 10 are connected in series by serial connection bus bar 5Y. Battery system 100 of FIG. 1 connects two adjacent prismatic battery cells 1 in parallel via bus bar 5 to form parallel battery unit 10, and further connects adjacent parallel battery units 10 in series. However, the battery system of the present invention does not necessarily have to connect two prismatic battery cells to form a parallel battery unit, but can also connect three or more prismatic battery cells to form a parallel battery unit, or connect entire prismatic battery cells in parallel.

As shown in FIG. 2, insulating plate 7 of current interrupter 6 is on the surface of sealing plate 12, and is partially inserted between sealing plate 12 and bus bar 5 of prismatic battery cells 1 that are connected to each other in parallel. Battery system 100 in which two or three prismatic battery cells 1 are connected in parallel includes one insulating plate 7 disposed at a position of facing sealing plates 12 of all prismatic battery cells 1 connected in parallel with each other, that is, two or three prismatic battery cells 1. In a battery system in which four or more prismatic battery cells are connected in parallel, a plurality of insulating plates divided into a plurality of pieces is disposed at a position of facing the sealing plates of the prismatic battery cells. Each of the plurality of insulating plates divided into the plurality of pieces is disposed at a position of facing the sealing plates of at least two or more prismatic battery cells connected in parallel. Insulating plate 7 is pushed up by deforming sealing plate 12 to interrupt the short circuit current. Since insulating plate 7 is pushed up only by sealing plate 12 of prismatic battery cell 1 which is deformed due to internal short circuit, bus bar 5 of prismatic battery cell 1 which is internally short circuited is pushed up most strongly.

Figure 5:
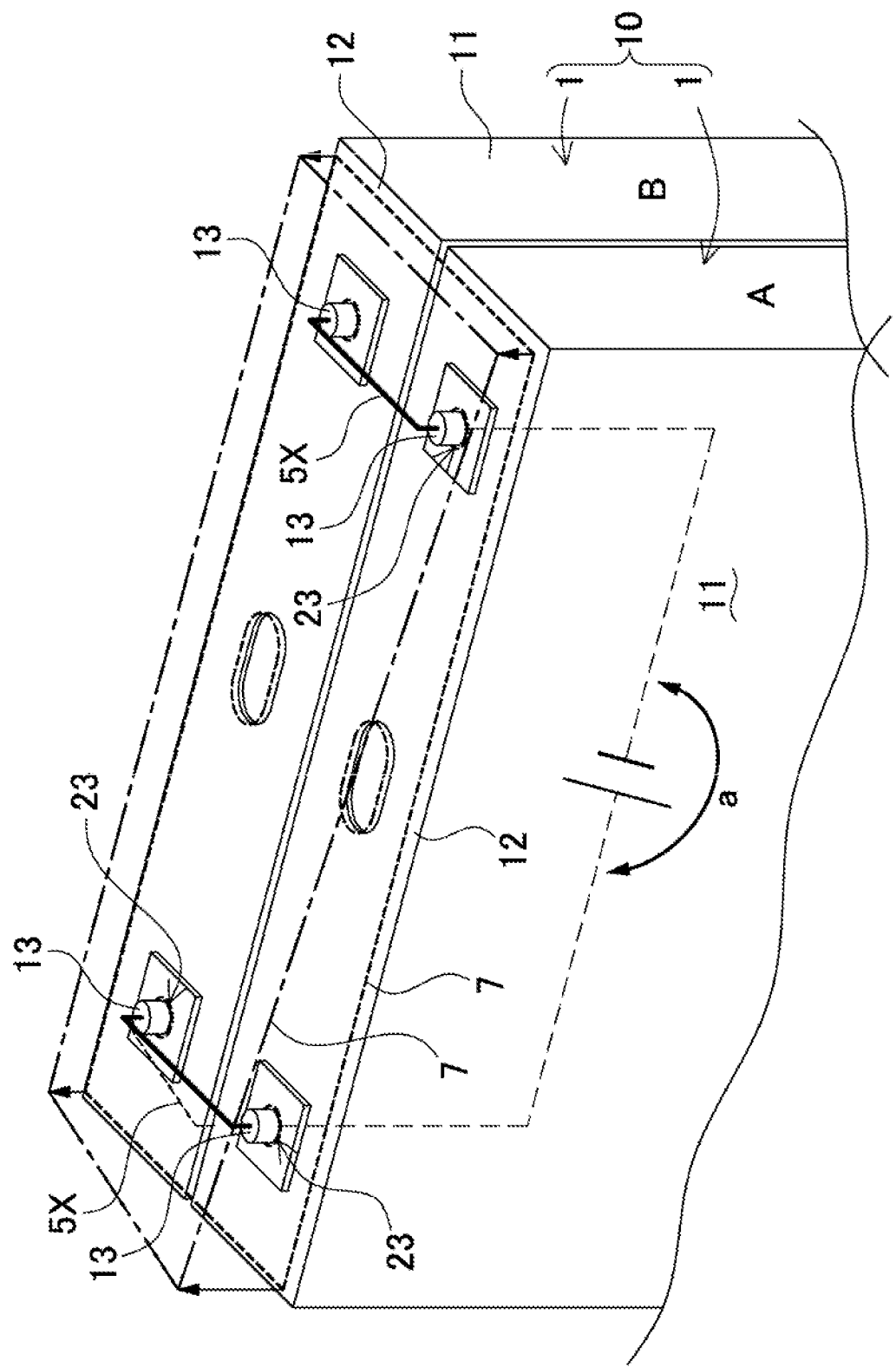
FIG. 5 is a schematic perspective view of a parallel battery unit, showing a state in which a short circuit current of the parallel battery is interrupted.
Figure 6:
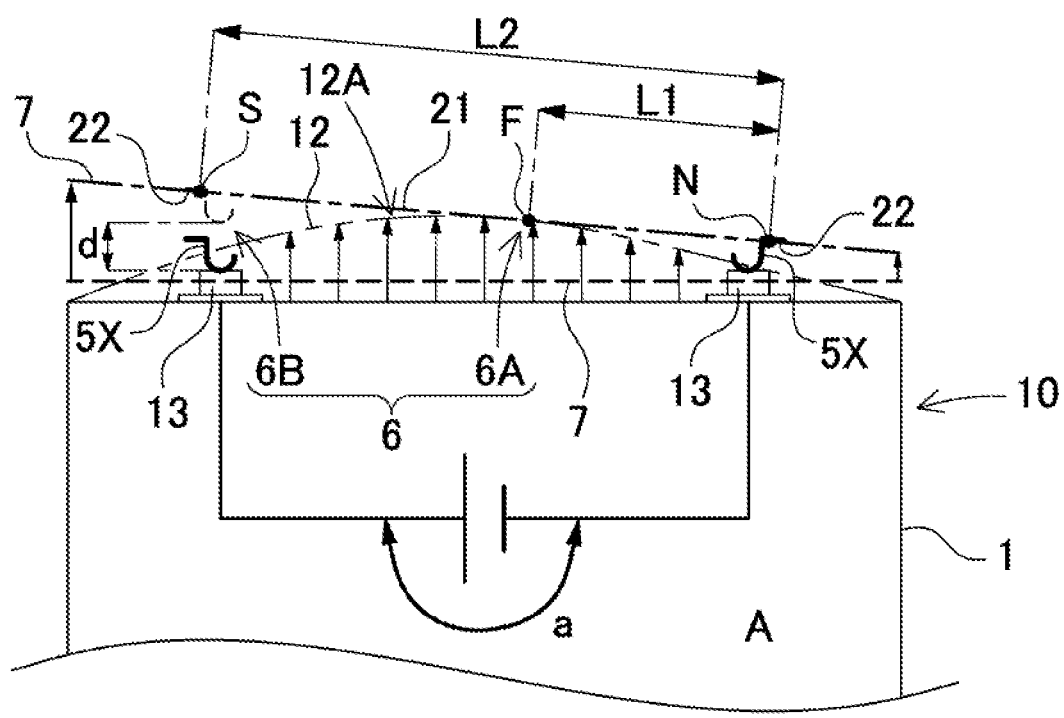
FIG. 6 is a longitudinal sectional view of the parallel battery unit shown in FIG. 5.
Figure 7:
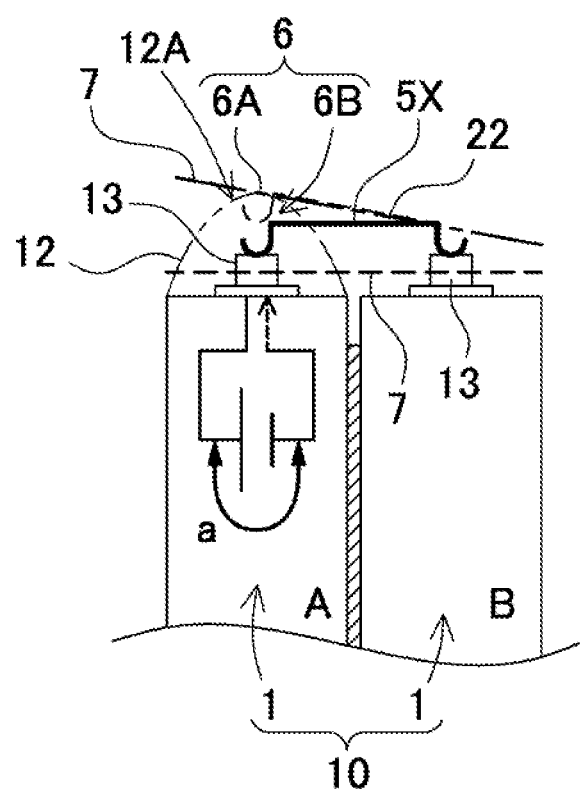
FIG. 7 is a cross-sectional view of the parallel battery unit shown in FIG. 5.

FIG. 5 is a schematic perspective view of parallel battery unit 10 in which two prismatic battery cells 1 are connected in parallel. This drawing shows a state where one prismatic battery cell A is internally short circuited and sealing plate 12 is deformed so that the short circuit current is instantaneously interrupted. Further, FIG. 6 is a schematic sectional view of FIG. 5 taken in the longitudinal direction, and FIG. 7 is a schematic sectional view of FIG. 5 taken in the lateral direction, both showing a state in which insulating plate 7 is pushed up by sealing plate 12. In these drawings, insulating plate 7 disposed on sealing plate 12 having a flat shape that does not deform is shown by the chain line, and insulating plate 7 pushed up by sealing plate 12 that deforms to project at a central portion is shown by the dashed dotted line.

In parallel battery unit 10 shown in these drawings, insulating plate 7 is disposed on the surface facing sealing plate 12. Insulating plate 7 has a single plate shape, and as shown in FIG. 2, a pair of pressing portions 22 that push up bus bar 5 are provided at both ends of plate portion 21. Insulating plate 7 is a plastic plate material that does not deform or a metal sheet whose surface is insulated. As shown in FIGS. 5 to 7, insulating plate 7 is an insulating plate having rigidity that pushes up bus bar 5 by pressing portions 22 when plate portion 21 is pushed up by sealing plate 12 and interrupts the short circuit current. Since the outer edge of flexible sealing plate 12 is fixed to exterior can 11, the central portion deforms to project when an internal short circuit occurs. Insulating plate 7 has plate portion 21 disposed at the central portion of sealing plate 12 such that it can be pushed up by projecting portion 12A of sealing plate 12, and pressing portion 22 is inserted between bus bar 5 and sealing plate 12.

In battery system 100 of FIG. 1, insulating plate 7 partitioned into a plurality of pieces is disposed on the upper surface of battery block 2 in this drawing, that is, on the electrode surface on which sealing plates 12 of the plurality of prismatic battery cells 1 are disposed on the same plane. The plurality of insulating plates 7 is provided with gap 17 at the boundary between adjacent insulating plates 7 and is pushed up without interfering with each other to interrupt the current.

Insulating plate 7 of FIGS. 2 and 5 has through-hole 23 into which electrode terminal 13 is inserted. Through-hole 23 has an inner shape larger than the outer shape of electrode terminal 13 and is inserted so as to be movable with respect to electrode terminal 13. As shown in FIGS. 5 to 7, when prismatic battery cell A is internally short circuited and sealing plate 12 projects, insulating plate 7 is pushed up by projecting sealing plate 12 to the position indicated by the dashed dotted line. Since sealing plate 12 has its periphery fixed to the periphery of exterior can 11, when the internal pressure rises, sealing plate 12 is deformed such that the central portion projects. Sealing plate 12 that projects at the central portion pushes up plate portion 21 of insulating plate 7, and pushed-up insulating plate 7 pushes up bus bar 5. Pushed-up insulating plate 7 separates bus bar 5 connected to electrode terminal 13 of internally short circuited prismatic battery cell A from electrode terminal 13. Bus bar 5 separated from electrode terminal 13 eliminates the external short circuit of the parallel battery and interrupts the short circuit current flowing in prismatic battery cell B, which is the parallel battery.

As shown in FIG. 6, insulating plate 7 separates bus bar 5 from electrode terminal 13 such that the position contacting projecting portion 12A of sealing plate 12 is point of effort F, the position of pushing up and separating bus bar 5 is point of load 8, the position of not pushing up or separating bus bar 5 is point of fulcrum N. Insulating plate 7 of FIG. 5 pushes up bus bar 5 connected to each electrode terminal 13 (four electrode terminals 13 in the drawing) to separate bus bar 5 from electrode terminals 13, but bus bar 5 is separated from electrode terminal 13 at the portion where the breaking strength is the weakest.

For example, in the battery system in which one electrode terminal 13 of prismatic battery cell 1 and bus bar 5 connected to this electrode terminal 13 are made of aluminum, and other electrode terminal 13 and bus bar 5 connected to this electrode terminal 13 are made of copper (in this specification, metals such as aluminum and copper are used to include alloys), since the coupling strength of aluminum is weaker than that of copper, the connection between electrode terminal 13 and bus bar 5, which are made of aluminum, is separated.

In FIG. 6, insulating plate 7 pushed up by projecting portion 12A has point of load S and point of fulcrum N disposed on both sides of point of effort F pressed by projecting portion 12A. When pushed up by sealing plate 12, and bus bar 5 is separated from electrode terminal 13 at point of load 8, insulating plate 7 is tilted. The curved surface of projecting portion 12A presses flat insulating plate 7. In this state, the length of point of effort F and point of load S becomes longer than the length of point of effort F and point of fulcrum N in tilted insulating plate 7. This is because point of effort F approaches point of fulcrum N as insulating plate 7 tilts. As point of effort F approaches point of fulcrum N, the ratio of length (L) from point of fulcrum N to point of effort F to length (L2) from point of fulcrum N to point of load S, i.e., lever ratio (L2/L1) becomes larger, and the distance over which point of load S separates bus bar 5 from electrode terminal 13, i.e., distance (d) between electrode terminal 13 and bus bar 5 becomes larger. When distance (d) between electrode terminal 13 and bus bar 5 is increased, the short circuit current can be unfailingly interrupted.

Figure 8:
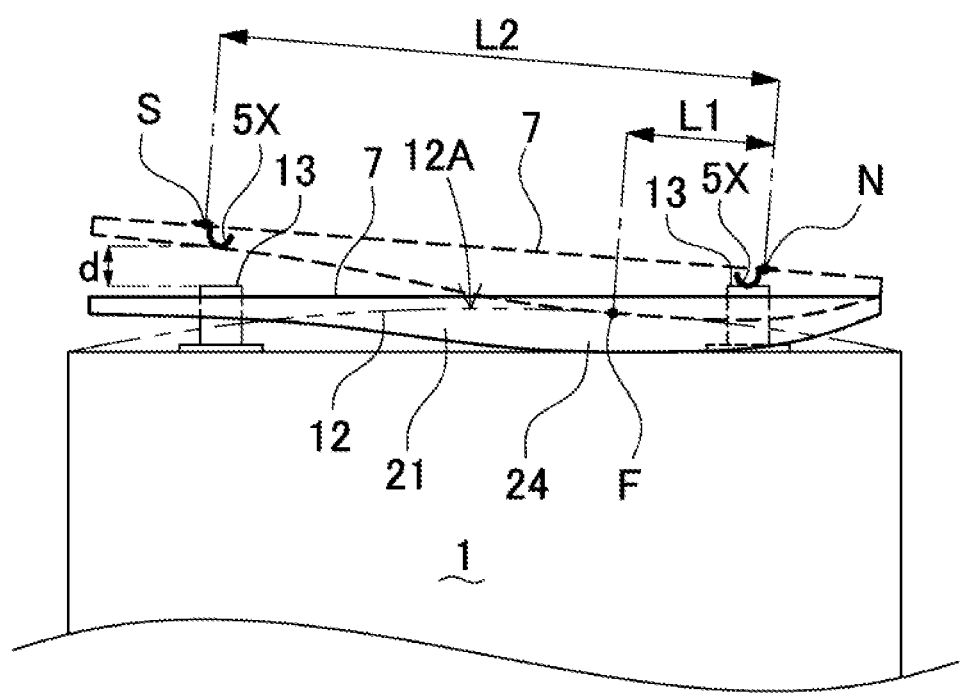
FIG. 8 is a schematic sectional view showing another example of the insulating plate pushed up by a sealing plate.
Figure 9:
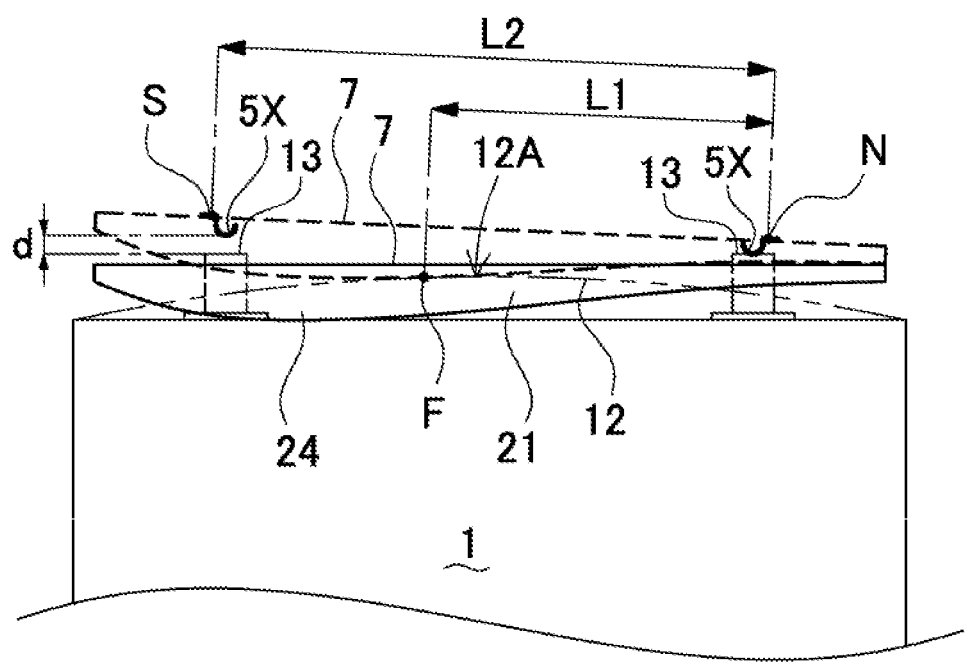
FIG. 9 is a schematic sectional view showing another example of an insulating plate pushed up by a sealing plate.

The battery system can control distance (d) between separated electrode terminals 13 and bus bar 5 by adjusting lever ratio (L2/L1). This is because the position of point of effort F can be changed by changing the shape of the surface of insulating plate 7 facing sealing plate 12. Insulating plate 7 shown in sectional views of FIGS. 8 and 9 projects on the surface facing sealing plate 12 in order to displace point of effort F pressed by projecting sealing plate 12 in the longitudinal direction. As shown in FIG. 8, insulating plate 7 can shift the apex of projecting portion 24 projecting toward sealing plate 12 to point of fulcrum N from the central portion to increase lever ratio (L2/L1), and as shown in FIG. 9, the apex of projecting portion 24 can be shifted to point of load S from the central portion to reduce lever ratio (L2/L1). Lever ratio (L2/L) can be increased to increase distance (d) over which bus bar 5 is separated from electrode terminal 13, and lever ratio (L2/L1) can be reduced to enhance the force of point of load S separating bus bar 5 from electrode terminal 13. Distance (d) over which bus bar 5 is separated from electrode terminal 13 and the force at which point of load S separates bus bar 5 from electrode terminal 13 have mutually contradictory characteristics. Therefore, lever ratio (L2/L1) is set to the optimum position in consideration of the separation distance and the separation force of bus bar 5.

Figure 10:
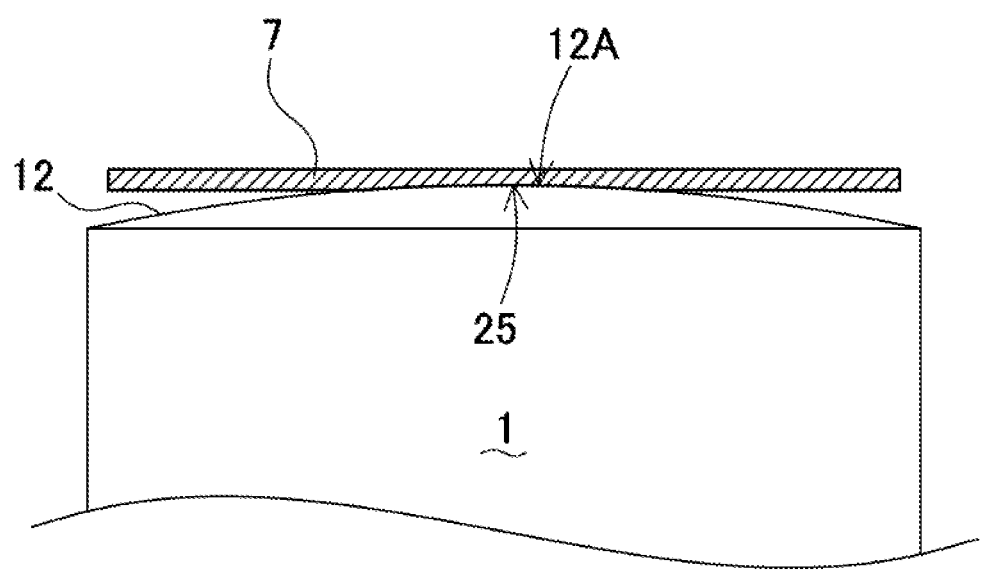
FIG. 10 is a schematic sectional view showing another example of the insulating plate pushed up by the sealing plate.

Further, insulating plate 7 shown in a sectional view of FIG. 10 has curved recess 25 for guiding projecting portion 12A on the surface facing sealing plate 12 so as to be pressed into a surface contact state by projecting portion 12A of sealing plate 12. Insulating plate 7 is pressed by projecting portion 12A of sealing plate 12 into the surface contact state, and therefore, is stably pushed up without difficulty by flexible sealing plate 12.

Figure 11:
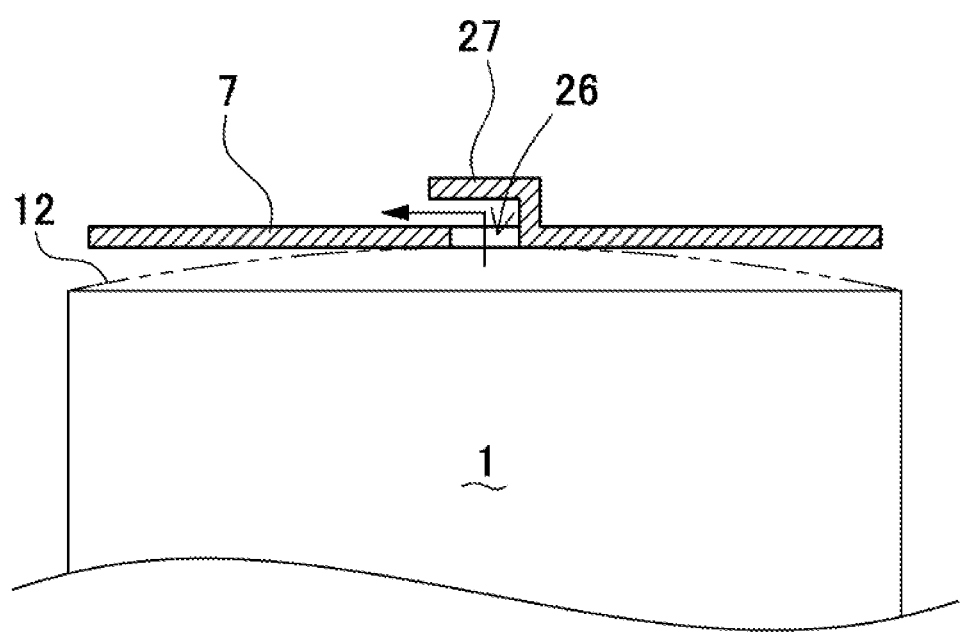
FIG. 11 is a schematic sectional view showing another example of the insulating plate.
Figure 12:
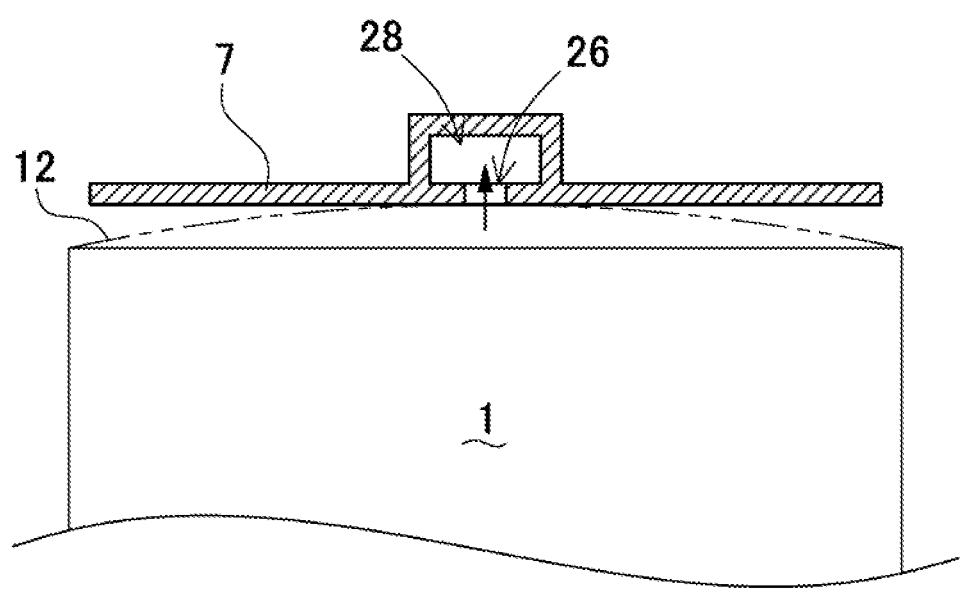
FIG. 12 is a schematic sectional view showing another example of the insulating plate.
Figure 13:
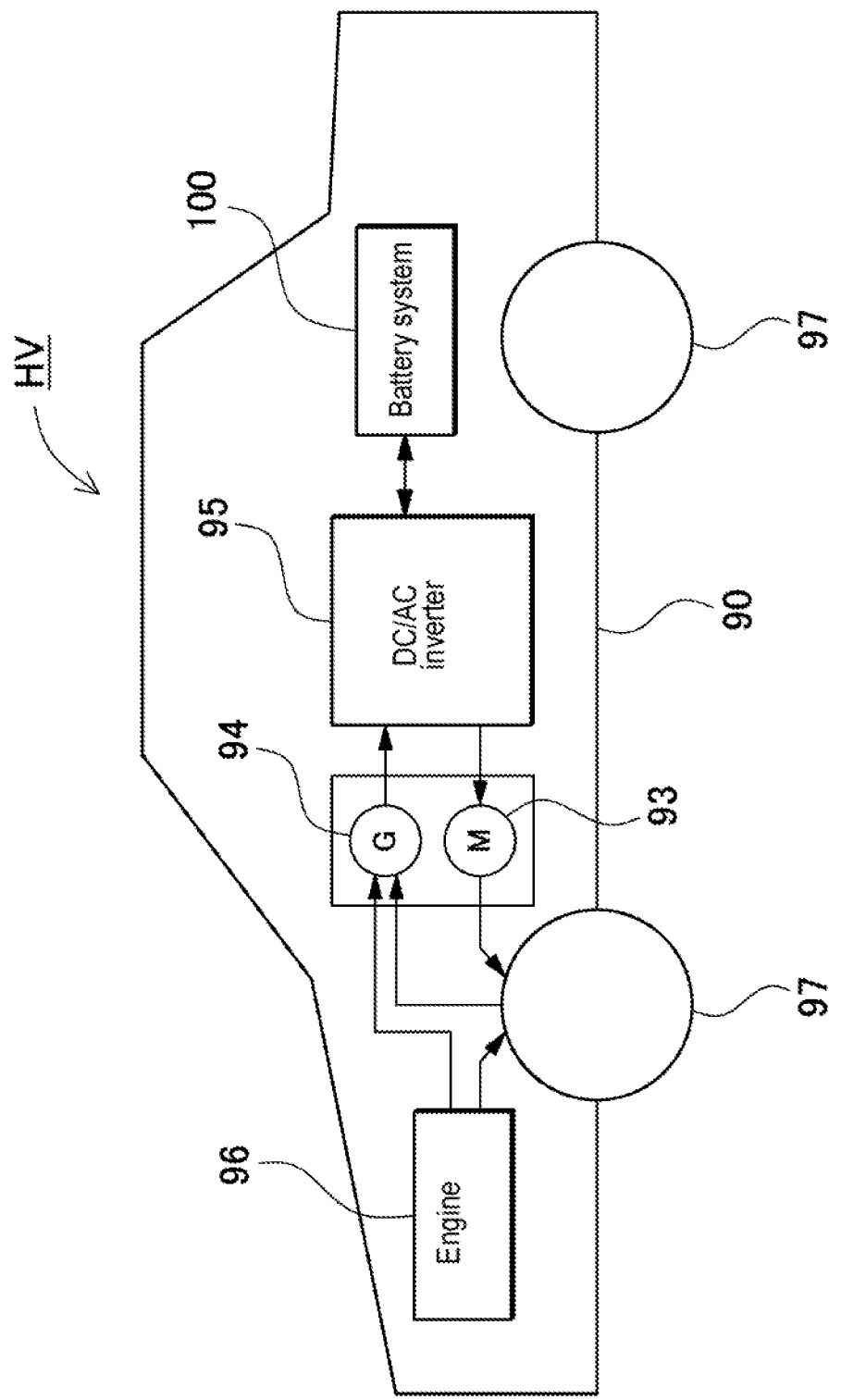
FIG. 13 is a block diagram showing an example in which a battery system is mounted on a hybrid vehicle that runs with an engine and a motor.
Figure 14:
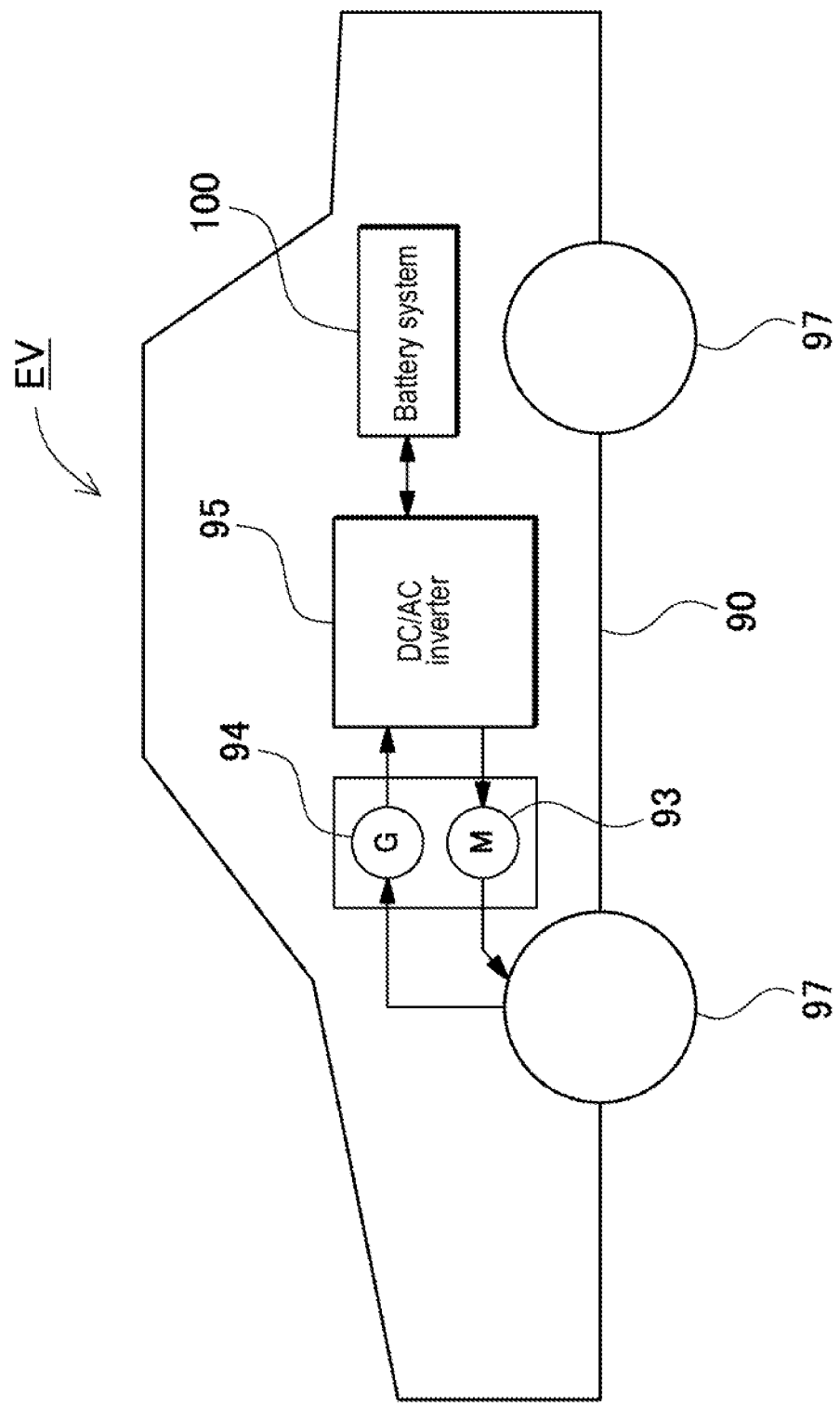
FIG. 14 is a block diagram showing an example in which the battery system is mounted on an electric vehicle that runs only with a motor.
Figure 15:
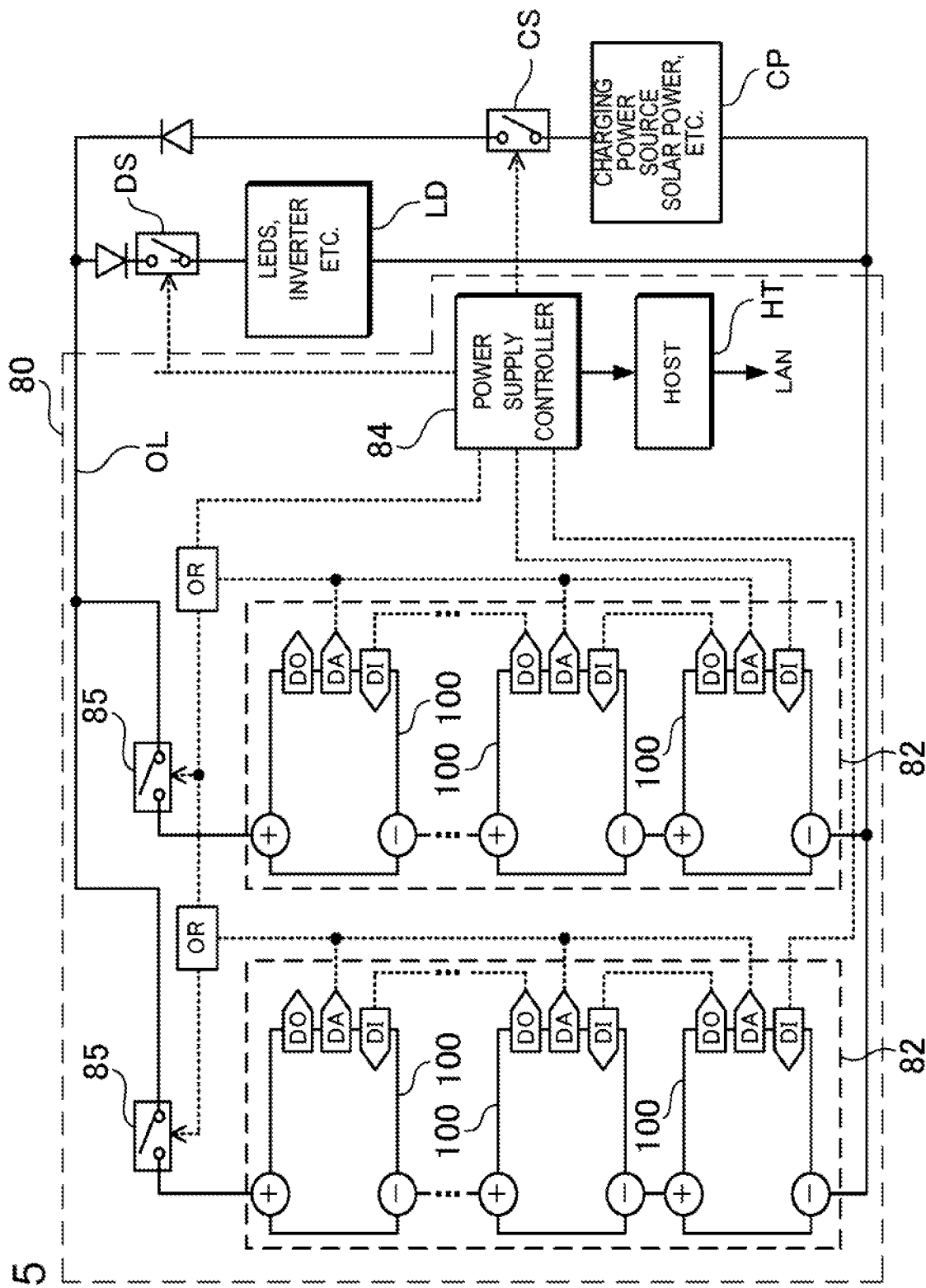
FIG. 15 is a block diagram showing an example of using the battery system for a power storage apparatus.

Further, insulating plate 7 of FIG. 2 is provided, at the central portion, with gas passage hole 26 for passing the exhaust gas discharged from exhaust valve 14 provided in the central portion of sealing plate 12. Insulating plate 7 can smoothly pass the exhaust gas discharged from exhaust valve 14. Insulating plate 7 of FIG. 11 is provided with cover 27 on the upper surface that prevents the exhaust gas passing through gas passage hole 26 from being ejected immediately upward. Since insulating plate 7 ejects the exhaust gas in the horizontal direction, it is possible to prevent damage to a circuit board and the like disposed immediately above. Further, since insulating plate 7 of FIG. 12 is provided with reservoir 28 of the exhaust gas that has passed through gas passage hole 26, it is possible to prevent the exhaust gas from being directly ejected to the surroundings.

Current interrupter 6 of battery system 100 includes deformation detector 6A that detects the deformation of sealing plate 12 due to internal short circuit and interrupting portion 6B that interrupts the short circuit current when the deformation of sealing plate 12 detected by deformation detector 6A exceeds the setting value. However, in the battery system of FIGS. 5 and 6, the coupling portion of electrode terminal 13 and bus bar 5 has coupling strength with which bus bar 5 is separated from electrode terminal 13 when insulating plate 7 is pushed up by sealing plate 12 that has been internally short circuited. Current interrupter 6 described above detects the deformation of sealing plate 12 by insulating plate 7, and insulating plate 7 separates bus bar 5 from electrode terminal 13, so that deformation detector 6A and interrupting portion 6B are configured by insulating plate 7. Current interrupter 6 interrupts the short circuit current of the parallel battery such that as the coupling strength between bus bar 5 and electrode terminal 13 has strength at which bus bar 5 is separated from electrode terminal 13 by being pushed up by sealing plate 12 of internally short-circuited prismatic battery cell 1.

The coupling strength between electrode terminal 13 and bus bar 5 is adjusted by an area where bus bar 5 is welded to electrode terminal 13. This is because the welding area between electrode terminal 13 and bus bar 5 can be reduced to weaken the coupling strength, and conversely, the welding area can be increased to increase the coupling strength. However, the coupling strength between bus bar 5 and electrode terminal 13 can be adjusted by the shape of the welded portion between electrode terminal 13 and bus bar 5, bus bar 5 fixed by spot welding can be adjusted by fusing current, bus bar 5 fixed by laser welding can be adjusted by the output of the laser beam used for laser welding, the irradiation area of the laser beam, and the irradiation time, and furthermore, bus bar 5 welded to electrode terminal 13 by ultrasonic vibration can be adjusted by the output of an ultrasonic vibrator, the pressing force, ultrasonic vibration time, and the type of a metal material of electrode terminal 13 and bus bar 5, and the like.

Current interrupter 6 can also cut off a part of parallel connection bus bar 5X to instantaneously interrupt the short circuit current. Parallel connection bus bar 5X is processed to have a narrow width as shown in FIG. 2, or, although not shown, a portion to be cut is thinned to forcibly reduce the tensile strength to interrupt the short circuit current. As shown in FIG. 2, parallel connection bus bar 5X is provided with cutouts 5a on both sides of the metal sheet and a narrow portion 5b at the central portion, or a part of the metal sheet is formed to be thinned by pressing or cutting so that the tensile strength is weakened, and when it is pushed up by pressing portion 22, it is broken or cut at this portion. In this case, the central portion of plate portion 21 of insulating plate 7 pushed up by projecting sealing plate 12 becomes deformation detector 6A, and pressing portion 22 pushing up parallel connection bus bar 5X becomes interrupting portion 6B. It should be noted that the breakage of parallel connection bus bar 5X does not necessarily have to be performed only by the mechanical action by pressing portion 22, and the pressing by pressing portion 22 and the heat generation due to the current flowing in narrow portion 5b of parallel connection bus bar 5X may be combined to break parallel connection bus bar 5X.

The battery system described above is optimum for a power source for a vehicle that supplies power to a motor that drives an electric vehicle. As an electric vehicle equipped with the battery system, an electric vehicle such as a hybrid vehicle or a plug-in hybrid vehicle that runs on both an engine and a motor, or an electric vehicle that runs only on a motor can be used, and the battery system is used as a power source for these electric vehicles.

(Battery System for Hybrid Cars)

FIG. 9 shows an example of mounting the battery system on a hybrid car that runs on both an engine and a motor. Vehicle HV equipped with the battery system shown in this drawing includes vehicle body 90, engine 96 and traveling motor 93 that drive vehicle body 90, battery system 100 that supplies electric power to motor 93, generator 94 for charging a battery of battery system 100, and wheels 97 that are driven by motor 93 and engine 96 to drive vehicle body 90. Battery system 100 is connected to motor 93 and generator 94 via DC/AC inverter 95. Vehicle HV runs on both motor 93 and engine 96 while charging and discharging the battery of battery system 100. Motor 93 drives the vehicle by being driven in a region where engine efficiency is low, for example, during acceleration or low speed traveling. Motor 93 is driven by electric power supplied from battery system 100. Generator 94 is driven by engine 96 or by regenerative braking when braking the vehicle, and charges the battery of battery system 100.

(Battery System for Electric Vehicles)

Further, FIG. 10 shows an example in which the battery system is mounted on an electric vehicle that runs only on a motor. Vehicle EV equipped with the battery system shown in this drawing includes vehicle body 90, traveling motor 93 that drives vehicle body 90, battery system 100 that supplies electric power to motor 93, generator 94 for charging a battery of battery system 100, and wheels 97 that are driven by motor 93 to drive vehicle body 90. Motor 93 is driven by electric power supplied from battery system 100. Generator

94 is driven by the energy from regenerative braking of vehicle EV to charge the battery of battery system 100.

(Battery System for Power Storage)

Furthermore, the present invention does not limit the application of the battery system to the battery system mounted on the electric vehicle, and can be used as a battery system for a power storage apparatus that stores natural energy such as solar power generation and wind power generation, and can be used for all applications that store large electric power, such as a battery system for a power storage apparatus that stores electric power at midnight. The present invention can also be used, for example, as a power source for households and factories, for a power supply system that is charged with sunlight, midnight power, or the like, and discharges when necessary, a power source for street lights that charges sunlight during the day and discharges at night, or a backup power source for driving traffic signals that is driven at the time of power failure. Such an example is shown in FIG. 11. Note that in the usage example as the power storage apparatus shown in FIG. 11, description is given of an example in which large capacity, high output power storage apparatus 80 in which, in order to obtain desired power, a large number of battery systems described above are connected in series or in parallel and a necessary controlling circuit is further added is constructed.

In power storage apparatus 80 shown in FIG. 11, a plurality of battery systems 100 is connected in a unit to constitute power source unit 82. In each battery system 100, a plurality of prismatic battery cells is connected in series and/or in parallel. Each battery system 100 is controlled by power supply controller 84. Power storage apparatus 80 drives load LD after charging power source unit 82 with charging power source CP. Therefore, power storage apparatus 80 has a charge mode and a discharge mode. Load LD and charging power source CP are connected to power storage apparatus 80 via discharge switch DS and charge switch CS, respectively. ON/OFF of discharge switch DS and charge switch CS is switched by power supply controller 84 of power storage apparatus 80. In the charge mode, power supply controller 84 turns on charge switch CS and turns off discharge switch DS to permit charging from charging power source CP to power storage apparatus 80. In addition, when charging is completed and the battery is fully charged, or when the capacity of a predetermined value or more is charged and in response to a request from load LD, power supply controller 84 turns off charge switch CS and turns on discharge switch DS to switch the mode to the charge mode to permit discharging from power storage apparatus 80 to load LD. If necessary, charge switch CS may be turned on and discharge switch DS may be turned on to supply load LD with power and charge power storage apparatus 80 simultaneously.

Load LD driven by power storage apparatus 80 is connected to power storage apparatus 80 via discharge switch DS. In the discharge mode of power storage apparatus 80, power supply controller 84 turns on discharge switch DS to connect to load LD and drives load LD with the power from power storage apparatus 80. As discharge switch DS, a switching element such as a field effect transistor (FET) can be used. ON/OFF of discharge switch DS is controlled by power supply controller 84 of power storage apparatus 80. Further, power supply controller 84 includes a communication interface for communicating with external devices. In the example of FIG. 11, it is connected with host device HT according to an existing communication protocol such as universal asynchronous receiver-transmitter (UART) or RS-232C. Further, if necessary, a user interface for the user to operate the power supply system can be provided.

Each battery system 100 includes a signal terminal and a power source terminal. The signal terminal includes input and output terminal DI, abnormality output terminal DA, and connection terminal DO. Input and output terminal DI is a terminal for inputting and outputting a signal from other battery system 100 or power supply controller 84, and connection terminal DO is a terminal for inputting and outputting a signal to and from other battery system 100. Further, abnormality output terminal DA is a terminal for outputting the abnormality of battery system 100 to the outside. Further, the power source terminal is a terminal for connecting battery systems 100 to each other in series and in parallel. Further, power source units 82 are connected to output line OL via parallel connection switch 85 and are connected in parallel with each other.

INDUSTRIAL APPLICABILITY

The battery system according to the present invention, and an electric vehicle and a power storage apparatus including the same can be suitably used as a battery system for a plug-in hybrid electric vehicle, a hybrid electric vehicle, an electric vehicle, or the like that can switch between an EV driving mode and an HEV driving mode. A backup power source that can also be appropriately used for applications including a backup power source that can be mounted on a computer server rack, a backup power source for wireless base stations such as cellular phones, a power storage power source for homes and factories, and a power source for street lights, a power storage apparatus combined with a solar battery, and a backup power source for traffic lights.

The invention claimed is:

1. A battery system comprising:
a battery block formed by stacking a plurality of prismatic battery cells each having a sealing plate, and positive and negative electrode terminals on the sealing plate;
a parallel connection bus bar connected to one of the electrode terminals of each of the plurality of prismatic battery cells and connecting some or all of the plurality of prismatic battery cells, including at least a first prismatic battery cell and a second prismatic battery cell, in parallel; and
a current interrupter that interrupts a short circuit current that flows into the second prismatic battery cell upon an internal short circuit of the first prismatic battery cell, wherein
the sealing plate of each of the plurality of prismatic battery cells has flexibility and is configured to deform so as to protrude outward in a thickness direction thereof perpendicular to a direction in which the plurality of prismatic battery cells are stacked and to a direction in which the positive and negative electrode terminal are aligned with each other, where an internal pressure rises due to an internal short circuit in a corresponding one of the plurality of prismatic battery cells, and
the current interrupter detects deformation in the thickness direction of the sealing plate of the first prismatic battery cell due to a rise in the internal pressure due to the internal short circuit of the first prismatic battery cell and interrupts the short circuit current which flows into the second prismatic battery cell.

2. The battery system according to claim 1, wherein the current interrupter includes an interrupting portion that interrupts the short circuit current which flows into the second prismatic battery cell where the deformation in the thickness direction of the sealing plate of the first prismatic battery cell exceeds a setting value indicative of an abnormal rise in the internal pressure of the first prismatic battery cell.

3. The battery system according to claim 2, wherein:
the interrupting portion is an insulating plate disposed on respective surfaces of the sealing plates of the some or all of the plurality of prismatic battery cells connected in parallel and partially disposed between the parallel connection bus bar and the sealing plates,
the parallel connection bus bar includes a pair of parallel connection bus bars,
the insulating plate includes a pair of pressing portions, each disposed between a corresponding one of the pair of parallel connection bus bars and the sealing plates, and a plate portion that is disposed on the respective surfaces of the sealing plates of the some or all of the plurality of prismatic battery cells connected in parallel and couples the pair of pressing portions, and
pressing force that presses the pair of parallel connection bus bar by the pair of pressing portions of the insulating plate when the insulating plate is displaced as the sealing plate of the first prismatic battery cell is deformed in the thickness direction thereof cuts off the pair of parallel connection bus bars or separates the pair of parallel connection bus bars from the electrode terminals to interrupt the short circuit current which flows into the second prismatic battery cell.

4. The battery system according to claim 3, wherein each of the pair of parallel connection bus bars has a cut portion that is cut by the pressing force of the pair of pressing portions of the insulating plate.

5. The battery system according to claim 3, wherein each of the pair of parallel connection bus bars has coupling strength to be separated from the electrode terminals by being pressed by the pair of pressing portions of the insulating plate.

6. An electric vehicle comprising the battery system according to claim 1, the electric vehicle comprising:
the battery system,
a motor for traveling supplied with electric power from the battery system,
a vehicle body equipped with the battery system and the motor, and
wheels driven by the motor to cause the vehicle body to travel.

7. A power storage apparatus comprising the battery system according to claim 1, the power storage apparatus comprising:
the battery system; and
a power supply controller that controls charging and discharging of the battery system,
wherein the power supply controller enables charging of the plurality of prismatic battery cells with electric power from outside, and controls charging to be performed on the plurality of prismatic battery cells.

* * * * *